(12) United States Patent
Baltsén

(10) Patent No.: US 10,489,916 B2
(45) Date of Patent: Nov. 26, 2019

(54) METHOD AND APPARATUS FOR UPDATING A BACKGROUND MODEL

(71) Applicant: Axis AB, Lund (SE)

(72) Inventor: Joakim Baltsén, Lund (SE)

(73) Assignee: Axis AB, Lund (SE)

( * ) Notice: Subject to any disclaimer, the term of this patent is extended or adjusted under 35 U.S.C. 154(b) by 240 days.

(21) Appl. No.: 15/617,686

(22) Filed: Jun. 8, 2017

(65) Prior Publication Data
US 2017/0358093 A1  Dec. 14, 2017

(30) Foreign Application Priority Data
Jun. 8, 2016  (EP) .................................... 16173451

(51) Int. Cl.
*G06T 7/194* (2017.01)
*G06K 9/46* (2006.01)
*G06K 9/62* (2006.01)
*G06T 7/136* (2017.01)

(52) U.S. Cl.
CPC ............ *G06T 7/194* (2017.01); *G06K 9/4676* (2013.01); *G06K 9/6202* (2013.01); *G06T 7/136* (2017.01); *G06T 2207/10016* (2013.01)

(58) Field of Classification Search
None
See application file for complete search history.

(56) References Cited

U.S. PATENT DOCUMENTS

| 8,009,918 B2 | 8/2011 | Van Droogenbroeck et al. |
| 10,152,645 B2 * | 12/2018 | Baltsen .............. G06K 9/00718 |
| 2010/0208998 A1 * | 8/2010 | Van Droogenbroeck .................... G06K 9/38 382/195 |
| 2012/0275706 A1 | 11/2012 | Lesellier |

(Continued)

FOREIGN PATENT DOCUMENTS

| JP | 2002-109546 A | 4/2002 |
| JP | 2010532898 T2 | 10/2010 |

(Continued)

OTHER PUBLICATIONS

"A Self-Adjusting Approach to Change Detection Based on Background Word Consensus", Pierre-Luc St-Charles et al.; 2015 IEEE Winter International Conference on Application of Computer Vision, Jan. 2, 2015; pp. 990-997.

(Continued)

*Primary Examiner* — Kim Y Vu
*Assistant Examiner* — Nathan J Bloom
(74) *Attorney, Agent, or Firm* — Volpe and Koenig, P.C.

(57) ABSTRACT

There is provided a method and an apparatus for updating a background model used for background subtraction of an image. An image is received and each pixel in the image is classified as being foreground or background by performing background subtraction using a background model which comprises a collection of background samples for each pixel in the image. For each pixel in the image being classified as background, the background model is updated by selecting (Continued)

a background sample in the collection of background samples associated with the pixel which fulfills a similarity condition, and replacing the background sample which fulfills the similarity condition with image data of the pixel.

8 Claims, 5 Drawing Sheets

(56) References Cited

U.S. PATENT DOCUMENTS

| | | | | |
|---|---|---|---|---|
| 2013/0162867 | A1* | 6/2013 | Gupta | H04N 5/2621 |
| | | | | 348/239 |
| 2013/0308856 | A1 | 11/2013 | Carpenter et al. | |
| 2016/0125255 | A1* | 5/2016 | Saitwal | G06K 9/38 |
| | | | | 382/165 |
| 2017/0330050 | A1* | 11/2017 | Baltsen | G06K 9/00718 |
| 2018/0101959 | A1* | 4/2018 | Liu | G06N 99/00 |

FOREIGN PATENT DOCUMENTS

| | | |
|---|---|---|
| JP | 2012-033100 A | 2/2012 |
| JP | 2012-084009 A | 4/2012 |

OTHER PUBLICATIONS

"Frame-rate omnidirectional surveillance and tracking of camouflaged and occluded targets", VS '99 Proceedings of the Second IEEE Workshop on Visual Surveillance; Jun. 26-29, 1999; pp. 48-55.

Neighborhood-level learning techniques for nonparametric scene models, Nick Mould et al.; Signal, Image and Video Processing, vol. 8, No. 6, Oct. 17, 2013; pp. 1015-1029, London.

"Background Subtraction with Outlier Replacement", Arun Varghese et al.; 2015 IEEE Recent Advances in Intelligent Computational Systems (RAICS), Dec. 10, 2015; pp. 45-49.

"A Self-Organizing Approach to Background Subtraction for Visual Surveillance Applications", Lucia Maddalena, et al., IEEE Transactions on Image Processing, vol. 17, No. 7, Jul. 2008; pp. 1167-1177.

"Real-time foreground-background segmentation using codebook model", Kyungnam Kim et al., Real-Time Imaging, Academic Press Limited, GB, vol. 11, No. 3, Jun. 2005, pp. 172-185.

"The detection of the real-time moving target based on multi core and multi channel", Dai Chunni; 2015 Seventh International Conference on Measuring Technology and Mechatronics Automation; Jun. 13-14, 2015; pp. 1193-1196.

"SACON: A Consensus Based Model for Background Subtraction",Wang et al.; Department of Electrical and Computer Systems Engineering, Technical Report MECSE-15-2005; pp. 1-8.

"ViBe: a disruptive method for background subtraction", Van Droogenbroeck et al.; Background Modeling and Foreground for Video Surveillance, chapter 7, Chapman and Hall/CRC, Jul. 2014, pp. 7.1-7.23.

EP 16 17 3451.2 European Search Report (Dec. 23, 2016).

* cited by examiner

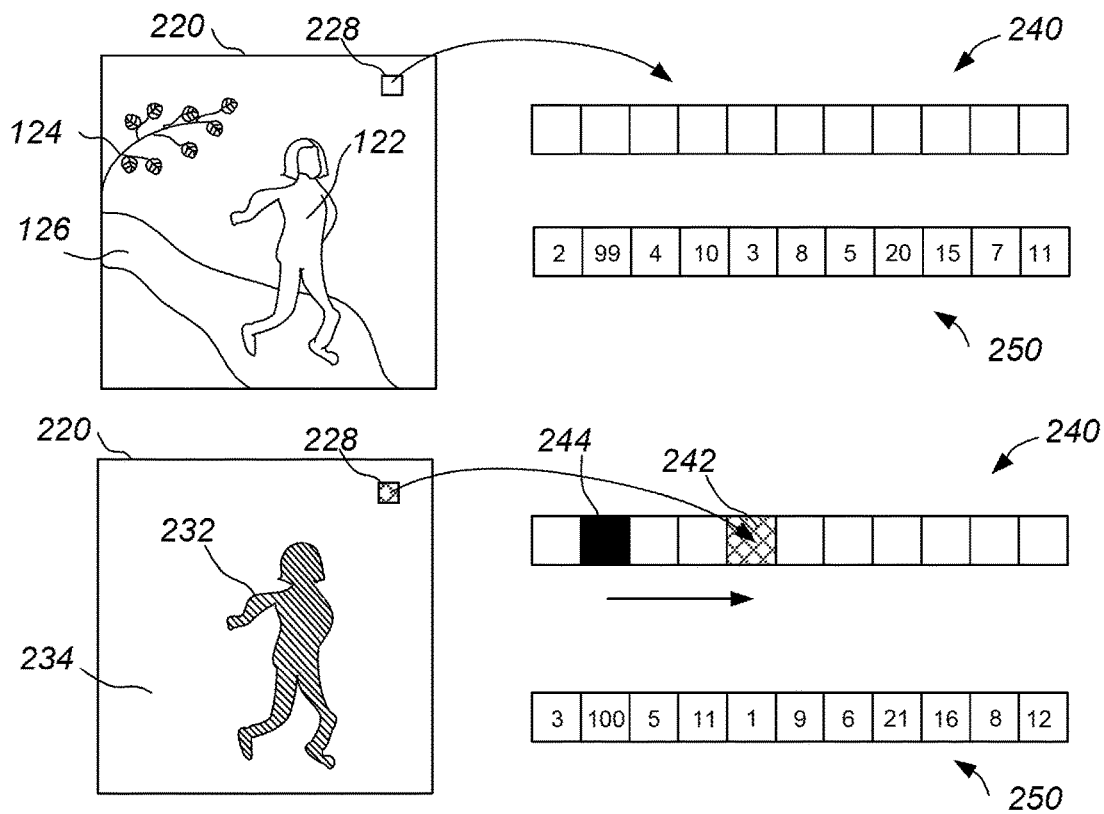
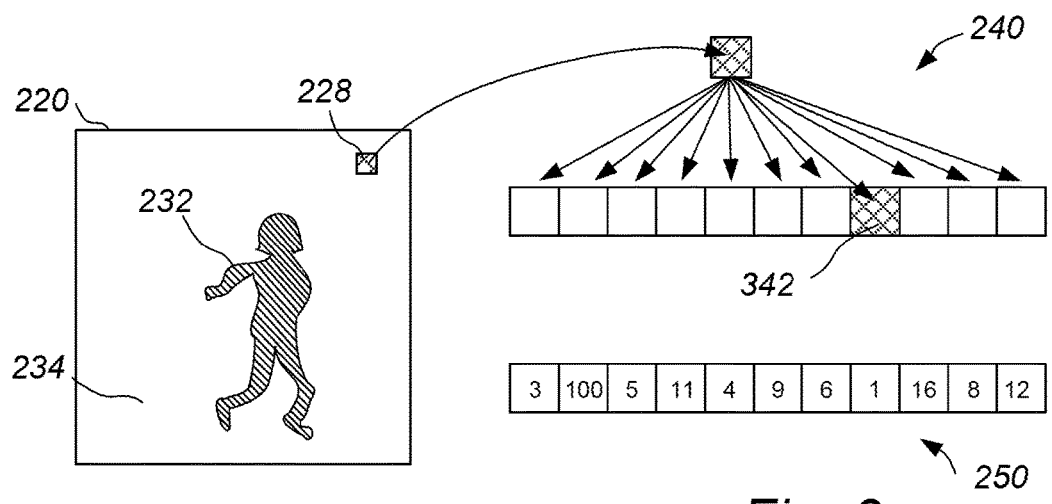
Fig. 2
Fig. 3

METHOD AND APPARATUS FOR UPDATING A BACKGROUND MODEL

FIELD OF INVENTION

The invention relates to the field of background subtraction in images. In particular, it relates to updating of a background model used for background subtraction of an image.

BACKGROUND

In video surveillance, it is important to be able to detect moving objects in a scene as captured in a video sequence. There are many tools for motion detection in videos. Some of them track objects frame by frame by following features in the video stream. Others compare a current frame with a static background frame, pixel by pixel. The latter is the basis of background subtraction which aims at extracting moving objects by detecting zones where significant change occurs. Moving objects are referred to as foreground while static objects are part of the background.

The separation of moving objects from the background is a complex problem, which becomes even more difficult if the background is dynamic, such as if there are swaying trees or water ripples in the background, or if the illumination varies. In particular, a dynamic background may result in that the number of false detections of moving objects increases.

A review of background subtraction methods is given in the text book "Background Modeling and Foreground Detection for Video Surveillance" (Editors: Thierry Bouwmans, Fatih Porikli, Benjamin Höferlin, and Antoine Vacavant), CRC Press, Taylor & Francis Group, Boca Raton, 2015. See for example chapters 1 and 7.

Background subtraction methods generally involve a comparison of a current frame of a video stream with a reference background frame or model, free of moving objects. By comparing an image to the background frame or model, a decision may be taken whether or not each pixel in the image belongs to the foreground or the background. In this way, the image may be divided into two complementary sets of pixels—the foreground and the background.

Background subtraction requires definition of an underlying background model and an update strategy to accommodate for background changes over time. Plenty of background models have been proposed in the literature. This includes parametric models and non-parametric models.

An example of a parametric model is to model the background at a pixel location in the image by a Gaussian distribution. This may work well for a static scene, but will fail if the background pixels are multi-modal distributed, e.g., if there are waving trees in the background.

In order to deal with multi-modal distributed backgrounds it has been proposed to model the background at a pixel location in the image by a mixture of Gaussian distributions. Although such models are effective in modelling multi-modal distributed backgrounds, they have other drawbacks. For example, the estimation of the parameters may be difficult in a real-world noisy environment and it has been questioned whether natural images exhibit a Gaussian behaviour.

Due to these drawbacks, non-parametric models have been considered in the literature. For example, non-parametric kernel density estimates of the probability density function of past pixel values have been proposed. A strength of these models is that they may quickly adapt to high-frequency events in the background. A drawback is that they may have difficulty in handling events in the background evolving at different speeds.

Another type of non-parametric models is referred to as sample-based models. In such models, the background in each pixel is modelled by means of a collection of past background samples. In order to accommodate for background changes over time, the collection of past background samples is updated as a pixel in a current frame has been classified as belonging to the background. Wang and Suter ("A consensus-based method for tracking: Modelling background scenario and foreground appearance". *Pattern Recognition*, 40(3), 2007) propose to update the collection of past background samples according to a first-in-first-out principle. This means that the collection of past background samples is updated such that the oldest background sample is removed from the collection and the pixel value of the current frame is added to the collection. In U.S. Pat. No. 8,009,918 B2 an alternative updating approach is described in which the pixel value of the current frame replaces a randomly selected background sample in the collection of background samples.

A drawback of these background updating methods is that they require that many background samples are stored per pixel in order to be robust to dynamic and multi-modal backgrounds, i.e., many background samples are needed to have a long memory of modalities. This leads to undesirably high processing and memory requirements. To handle sporadic background movements, such as sudden wind beams, an intractable amount of background samples would be required. There is thus room for improvements.

SUMMARY

A method and apparatus for a sample-based background model which allows the number of background samples to be kept at a low level, thereby reducing processing and memory requirements, at the same time as the model has a long memory of modalities is disclosed.

According to a first aspect, a method performed in an apparatus for updating a background model used for background subtraction of an image is provided. The method comprising: receiving an image; classifying each pixel in the image as being foreground or background by performing background subtraction using a background model which comprises a collection of background samples for each pixel in the image; updating the background model by, for each pixel in the image being classified as background; selecting a background sample in the collection of background samples associated with the pixel which fulfills a similarity condition; and replacing the background sample which fulfills the similarity condition with image data of the pixel.

The proposed method is thus a method of updating a sample-based background model. As a new image is received at time t, the background model built at time t−1 is used to classify the pixels in the new image as background or foreground. Thereafter, the background model is updated with background samples of the new image.

The method proposes to update the background model by replacing a background sample which is similar to the image data in the pixel which has been classified as background. Typically, this will be a background sample belonging to the same modality as the concerned pixel. In this way, the number of redundant background samples in the background model may be kept at a minimum. For instance, even a modality which is very common at a certain pixel location in a sequence of images may be represented by a single background sample in the background model. As a result, the processing and memory requirements are reduced since less background samples need to be stored and processed when performing background subtraction using the background model. At the same time, the memory of modalities, i.e. the temporal memory, of the background model is not reduced. In conclusion, a reduced number of background samples may be used to represent the same memory of modalities compared to prior solutions.

By a background model is generally meant a model which represents the background in an image at a pixel level.

By background subtraction is generally meant a comparison of an image with a background model. By comparing an image to the background model, a decision may be taken whether or not each pixel in the image belongs to the foreground or the background.

By a background sample is generally meant a sample of an image, i.e., image data, an observation or an intensity value (possibly in several color channels), in a pixel which has been classified as belonging to the background.

By a similarity condition is generally meant any condition, or function, which, based on a background sample and image data of a pixel, gives a measure of the similarity of the background sample and the image data of a pixel. The similarity condition could for example be based on a mathematical distance between the background sample and the image data of a pixel, such as measured by a norm, such as an L1-norm or a L2-norm. The similarity condition may for instance be fulfilled if the distance is smaller than a threshold (herein referred to as a similarity threshold).

In particular, the similarity condition may be fulfilled with respect to a background sample if the background sample differs from the image data in the pixel by less than a similarity threshold.

Different approaches may be used in order to find a background sample in the collection of background samples associated with a particular pixel which fulfills the similarity condition. For example, the step of selecting may comprise iteratively searching the collection of background samples associated with the pixel until a background sample which fulfills the similarity condition is found. In other words, the first background sample found when iterating the collection of background samples that fulfills the similarity condition may be selected. This is advantageous in that processing power may be reduced since the search may be terminated as soon as a background sample which fulfills the similarity condition has been found.

The collection of background samples associated with the pixel may be iteratively searched by comparing the image data of the pixel to the background samples in the collection of background samples one by one until a background sample which fulfills the similarity condition is found. The iterative search is thus initiated at some position in the collection of background samples and goes through the collection of background samples one by one, i.e. sequentially, until a first background sample which fulfills the similarity condition is found.

In order to avoid that the same position in the collection of background samples is updated all the time during gradual variations of the background (i.e. gradual variations between successive images in an image sequence), the iterative search could start at different positions, or indices, in the collection of background samples each time the background model is to be updated.

In some embodiments, the start position in the collection is randomly selected. In more detail, the collection of background samples associated with the pixel may be indexed, wherein the iterative search is initiated at a randomly selected index in the collection of background samples.

According to other embodiments, the start position in the collection is set to be different from the start position used with respect to the last update of the background model for the pixel. More specifically, the image may be part of a sequence of images, and the collection of background samples associated with the pixel may be indexed, wherein the iterative search is initiated at an index in the collection of background samples which is different from an index used to initiate an iterative search with respect to a corresponding pixel in a preceding image in the image sequence.

In particular, the iterative search may be initiated at an index in the collection of background samples which follows an index used to initiate an iterative search with respect to pixels in a preceding image in the image sequence. In this way, it becomes easy to keep track of at what position in the collection to initiate the search.

It is to be noted that there may be alternative ways of selecting a start position of the search, such as selecting a start index for a current search which precedes a start index used in a previous search. It is further noted that different start positions may be used for different pixels in the image. Preferably, for reasons of simplicity and efficiency, the same start position in the collection is selected for all pixels in the image. In this way, a minimum of processing and memory requirement is used to keep track on the start position.

Another approach is to instead replace the background sample in the collection which is most similar to the image data in the pixel. In more detail, the step of selecting may comprise selecting, among background samples which fulfill the similarity condition, a background sample which is most similar to the image data of the pixel. By replacing the most similar background sample, redundant information in the collection is kept at a minimum. However, this may e.g. come at the cost of perhaps replacing the same background sample position in the collection during gradual variations of the background.

In order to select the most similar background sample in the collection, the step of selecting may comprise comparing image data of the pixel to all background samples in the collection of background samples so as to identify a background sample which differs the least from to the image data of the pixel.

It may be the case that no background sample in the collection of background samples fulfills the similarity condition. In such situations, a background sample which does not fulfill the similarity condition may be replaced. For example one may revert to one of the prior art approaches, including replacing a background sample at random, or replacing the oldest background sample in the collection (by keeping count of when the background sample was updated last). Another possibility is to choose the last background sample visited during the iterative search of the collection of background samples.

The method may further comprise a mechanism for replacing samples that are old, for the purpose of avoiding having background samples in the collection which are no longer relevant.

This could be achieved by replacing samples that are older than a predefined time limit. More specifically, the method may further comprise, for each pixel in the image: keeping track of for how long each background sample has been in the collection of background samples associated with the pixel, wherein the step of selecting and replacing are made on a condition that no background sample has been in the collection of background samples for longer than a predefined time limit, and wherein, if a background sample has been in the collection for longer than the predefined time limit, the background sample which has been in the collection of background samples for longer than the predefined time limit is replaced with image data of the pixel.

As an alternative, background samples could be replaced at long time intervals. In more detail, in a sequence of images, the updating mechanism could be based on the similarity approach described above for most images. However, for some images selected at regular time intervals, background samples at a certain position in the collections of background samples (the position being the same for all collections) could be replaced by background samples from the image. The certain position could be selected at random, or deterministically. For example, the certain position (given in terms of an index in the collections) could be increased by one each time the updating at regular time intervals is performed.

In more detail, the method may further comprise: receiving a sequence of images and repeating the steps of classifying and updating for each image in the sequence of images, except for every Nth image in the sequence of images, wherein N>2, for which the updating of the background model is instead made by, for each pixel in the Nth image being classified as background; and replacing a background sample in the collection of background samples associated with the pixel with image data of the pixel, wherein the replaced background sample has an index in the collection of background samples which is the same for all pixels in the Nth image.

The value of N does not need to be constant, but could be set to vary. For example, it could have a smaller value in the beginning of the image sequence compared to later on in the image sequence.

In order to classify the pixels of an image as belonging to the foreground or the background, the image data of the pixel (typically an intensity value) may generally be compared to the collection of background samples which are associated with the pixel. If the image data in a pixel is similar to a predefined number of background samples, the pixel does likely belong to the background. Otherwise it does likely belong to the foreground.

More specifically, the step of classifying each pixel in the image as being foreground or background may comprise, for each pixel in the image: comparing the image data of the pixel to each of the background samples in the collection of background samples associated with the pixel, and determining that the pixel is foreground if the number of background samples which differ from the image data of the pixel by less than a classification threshold is lower than a predefined number.

In prior art methods, the predefined number is typically equal to two or larger. However, with the present method, the predefined number may typically be set to one. Since the redundancy in the collection of background samples is reduced, it is possible that each modality is only represented by one background sample. Accordingly, it may be appropriate to set the predefined number to one.

When the predefined number is equal to one, there is a particularly computationally efficient implementation of the classification step. In such case, a pixel belongs to the foreground if there is no background sample in the collection of background samples which is similar (as defined by differing by less than the threshold) to the image data in the pixel. The event "no background sample is similar" is equivalent to the event "not at least one background sample is similar". Suppose that there are N background samples in the collection. Then the event "at least one background sample is similar" may be expressed as the event "(background sample 1 is similar) or (background sample 2 is similar or . . . or (background sample N is similar)". This may be expressed as the union $U_{i=1}^{N}\{$background sample i similar$\}$. In conclusion, the event "no background sample is similar" is equivalent to the event "not $U_{i=1}^{N}\{$background sample i is similar$\}$".

For this reason, the step of determining that the pixel is foreground may comprise: checking if at least one of the background samples associated with the pixel differ from the image data of the pixel by less than a classification threshold by performing a logical "or"-operation, and if not, determining that the number of background samples which differ from the image data of the pixel by less than a threshold is lower than the predefined number, thereby determining that the pixel is foreground.

Since logical operations typically require less processing power and memory usage than a summation followed by a comparison to a threshold number, this will be computationally efficient.

According to a second aspect, a computer program product comprising a (non-transitory) computer-readable medium having computer code instructions stored thereon for carrying out the method of the first aspect when executed by a device having processing capability is disclosed.

According to a third aspect, an apparatus for updating a background model used for background subtraction of an image is disclosed. The apparatus comprising: a receiver configured to receive an image; a classification component configured to classify each pixel in the image as being foreground or background by performing background subtraction using a background model which comprises a collection of background samples for each pixel in the image; a background updating component configured to update the background model by, for each pixel in the image being classified as background: selecting a background sample in the collection of background samples associated with the pixel which fulfills a similarity condition, and replacing the background sample which fulfills the similarity condition with image data of the pixel.

The second and third aspects may generally have the same features and advantages as the first aspect. It is further noted that the disclosure relates to all possible combinations of features unless explicitly stated otherwise.

BRIEF DESCRIPTION OF THE DRAWINGS

A more detailed understanding may be had from the following description, given by way of example in conjunction with the accompanying drawings where:

FIGS. 2, 3, 4 and 5 schematically illustrate different approaches for replacing background samples of a background model according to embodiments;

DETAILED DESCRIPTION

The method and apparatus for updating a background model used for background subtraction of an image will now be described more fully hereinafter with reference to the accompanying drawings, in which embodiments are shown. The systems and devices disclosed herein will be described during operation.

Figure 1:
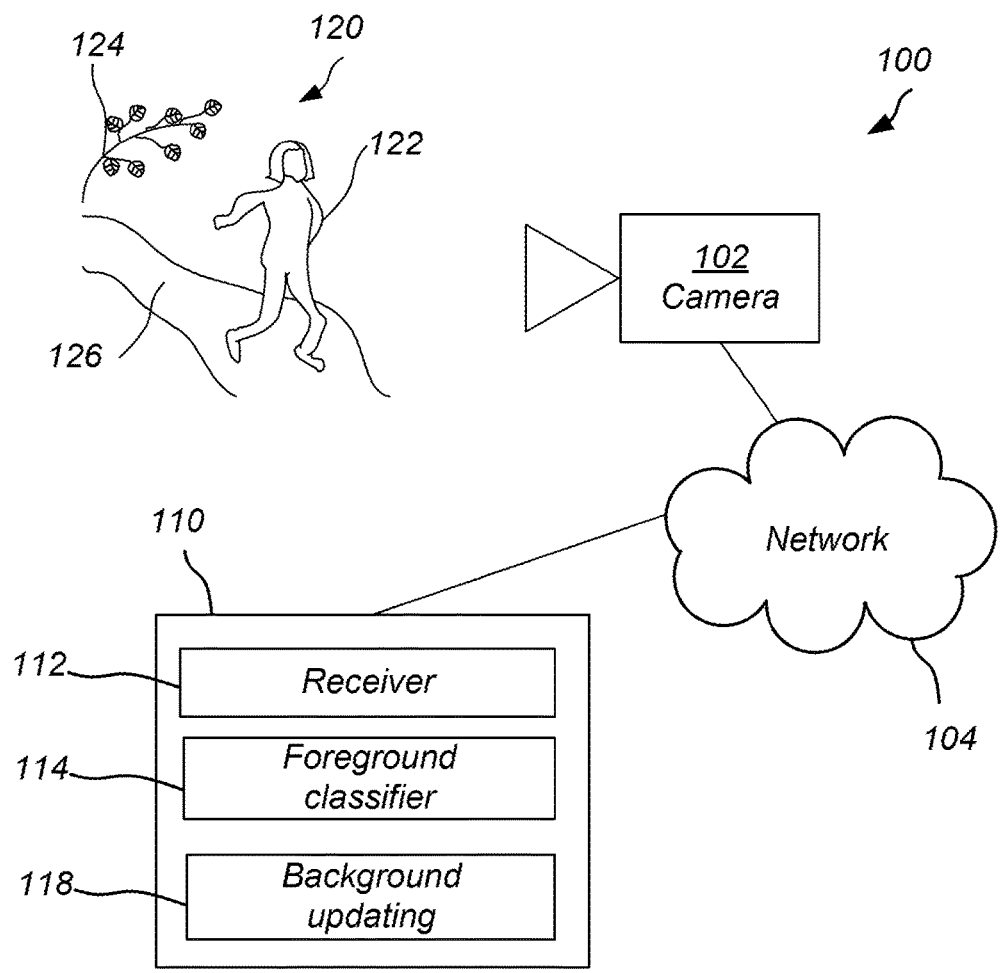
FIG. 1 schematically illustrates a camera system comprising an apparatus for updating a background model used for background subtraction of an image.

FIG. 1 illustrates a camera system 100 comprising a camera 102 and an apparatus 110 for updating a background model used for background subtraction of images captured by the camera 102. The camera 102 is operatively connected to the apparatus 110, e.g. via a wired or wireless network 104.

The camera 102 is arranged to capture a sequence of images of a scene 120, and transmit the captured sequence of images to the apparatus 110. In particular, the camera 102 may be a surveillance camera which for instance may be used to follow moving objects in the scene 120. The scene 120 may comprise different objects. For example, there may be moving objects 122, here illustrated by a running person, which should be tracked in the sequence of images, hence belonging to the foreground. There may also be background objects 124 and 126, here illustrated by a branch of a tree 124 and a trail 126. The background objects may be static, such as the trail 126, or dynamic, such as the branch 124 which may sway back and forth as the wind blows.

The apparatus 110 comprises a receiver 112, a foreground classifier 114, and a background updating component 118. The internal components 112, 114, and 118 of the apparatus 110 may be implemented in hardware, software, or a combination thereof. For example, the apparatus 110 may comprise a processor and a non-transitory computer-readable medium (i.e., a memory) which may store software instructions for carrying out any method disclosed herein when executed by the processor.

The operation of the apparatus 110 will now be described with reference to FIGS. 1-6 and the flow chart of FIG. 7.

In step S02 the receiver 112 receives an image 220 depicting the scene 120 from the camera 102, for instance over the network 104. The image 220 is part of a sequence of images sent from the camera 102 to the apparatus 110. For example, the image 220 may correspond to a frame of a video sequence. In the image 220 there are depicted foreground objects 122 and background objects 124, 126.

In step S04, the foreground classifier 114 classifies each pixel 228 as belonging to the background 234 or the foreground 232. For this purpose, the foreground classifier 114 makes use of a background model. The background model comprises a collection 240 of background samples for each pixel in the image 220. As shown in FIG. 2, pixel 228 is associated with a collection 240 of background samples. The collection 240 of background samples may be arranged in an array, here illustrated by a vector. The collection 240 of background samples for each pixel may comprise about 10-20 background samples. In this example, the first background sample in the collection 240 has an age of 2, the second background sample has an age of 99, etc. The numbers selected in this example are only for reasons of illustration. In practice, the numbers may correspond to the number of frames for which the background sample has been in the collection, or how many time units (e.g., measured in seconds, minutes or hours), the background sample has been in the collection 240.

The collection of background samples 240 may also, in some embodiments, be associated with a data structure 250, such as an array, which keeps track of the age of each background sample in the collection 240, i.e., for how long the background sample has been part of the collection 240.

When classifying each pixel 228 in the image 220 as background 234 or foreground 232, the foreground classifier 114 may apply background subtraction as for example described in Wang and Suter ("A consensus-based method for tracking: Modelling background scenario and foreground appearance". *Pattern Recognition,* 40(3), 2007). In the example of FIG. 2, the foreground classifier 114 will, by applying the background subtraction, classify pixels falling inside the object 122 as belonging to the foreground 232, and the other pixels will be classified as background 234. Pixel 228 is in this example classified as background 234.

In more detail, denote the observation in pixel m at time t of the image sequence by $x_t(m)$, and the collection of background samples of pixel m by $\{x_i(m) | i=1, \ldots, N\}$. Each observation $x_t = (x_t^{C_1}, \ldots, x_t^{C_k})$ has k channels (e.g., in RGB color space each observation is expressed by three channels of R, G, B). The foreground classifier 114 may, for each pixel 228 in the image 220, compare the image data, i.e. the intensity value (for each channel if applicable), to each background sample in the collection 240 associated with the pixel 228, to see if the image data differs from each of the background samples by less than a threshold $T_r$. For example, the foreground classifier 114 may associate background samples which differ from the image data in the pixel by less than the threshold $T_r$ with the value "one", and the other background samples may be associated with the value "zero" according to:

$$\Gamma_i^c(m) = \begin{cases} 1 & \text{if } |x_i^c(m) - x_t^c(m)| \leq T_r \\ 0 & \text{otherwise} \end{cases} \quad (1)$$

If the number of background samples in the collection 240 which differs from the image data of the pixel by less than the threshold $T_r$ is above or equal to a predefined number $T_N$, the foreground classifier 114 may determine that the pixel belongs to the background. Otherwise it belongs to the foreground.

This may be implemented by calculating a binary mask $B_t$ which at time t takes the value "one" for background pixels and "zero" for foreground pixels according to:

$$B_t(m) = \begin{cases} 1 & \text{if } \sum_{i=1}^{N} \Gamma_i^c(m) \geq T_N, \forall c \in \{C_1, \ldots, C_k\} \\ 0 & \text{otherwise} \end{cases} \quad (2)$$

Expressed differently, the foreground classifier 114 may thus count the number of background samples in the collection 240 which differs from the image data of the pixel 228 by less than the threshold $T_r$. If the number is equal to or exceeds a predefined number $T_N$, the foreground classifier determines that the pixel belongs to the background 234, and otherwise to the foreground 232. Thus, if the foreground classifier finds at least $T_N$ background samples in the collection 240 which are similar (in the sense of equation 1) to the image data in the pixel 228, the pixel 228 will be classified as belonging to the background, and otherwise to the foreground.

It has been found that it may be enough if the image data in the pixel 228 is similar to one background sample, i.e. $T_N=1$. In such cases, equation 2 may be implemented in an efficient manner by using logical "or" operations. In particular, equation 2 may be rewritten as:

$$B_t(m) = \begin{cases} 1 & \text{if } \bigcup_{i=1}^{N} \{|x_i^c(m) - x_t^c(m)| \leq T_r\} \\ 0 & \text{otherwise} \end{cases} \quad (3)$$

Thus, the foreground classifier 114 may check if at least one of the background samples associated with the pixel differ from the image data of the pixel by less than a threshold by performing a logical "or"-operation (i.e. the first background sample, or the second background sample, or the third background sample, etc.) should differ from the image data of pixel 228 by less than the threshold $T_r$. If this is not the case, the foreground classifier 114 will classify the pixel as belonging to the foreground. In this way, computational complexity may be saved since logical operations require less processing power and less memory usage.

The foreground classifier 114 may apply a safety margin in order to be sure that only background pixels are used later on in the update of the background model. In more detail, the foreground classifier 114 may spatially extend regions which have been classified as foreground (such as foreground region 232). This may for instance be implemented by applying morphological operations on the classification result prior to replacing image contents. For example, a morphological "dilate" operation on the foreground regions will cause them to grow spatially, thereby adding a safety margin which compensates for potential classification errors.

The threshold $T_r$ may be the same for all pixels in the image 220. However, in some embodiments, the threshold $T_r$ may vary with the position of the pixel in the image. Thus, different pixels may have different values of the threshold $T_r$. Further, the threshold $T_r$ may vary with time. Generally, the foreground classifier 114 may set the threshold $T_r$ depending on how often background samples at the position of the pixel tend to change values between consecutive images in the image sequence. In particular, the threshold $T_r$ may be set to be larger for pixels where the background has a tendency to change values often, in comparison to pixels where the background is more or less the same all the time. In this way, the classification can be set to be less sensitive in regions where the background often changes values, i.e., transitions from one modality to another due to, e.g., swaying branches in the scene.

Figure 6:
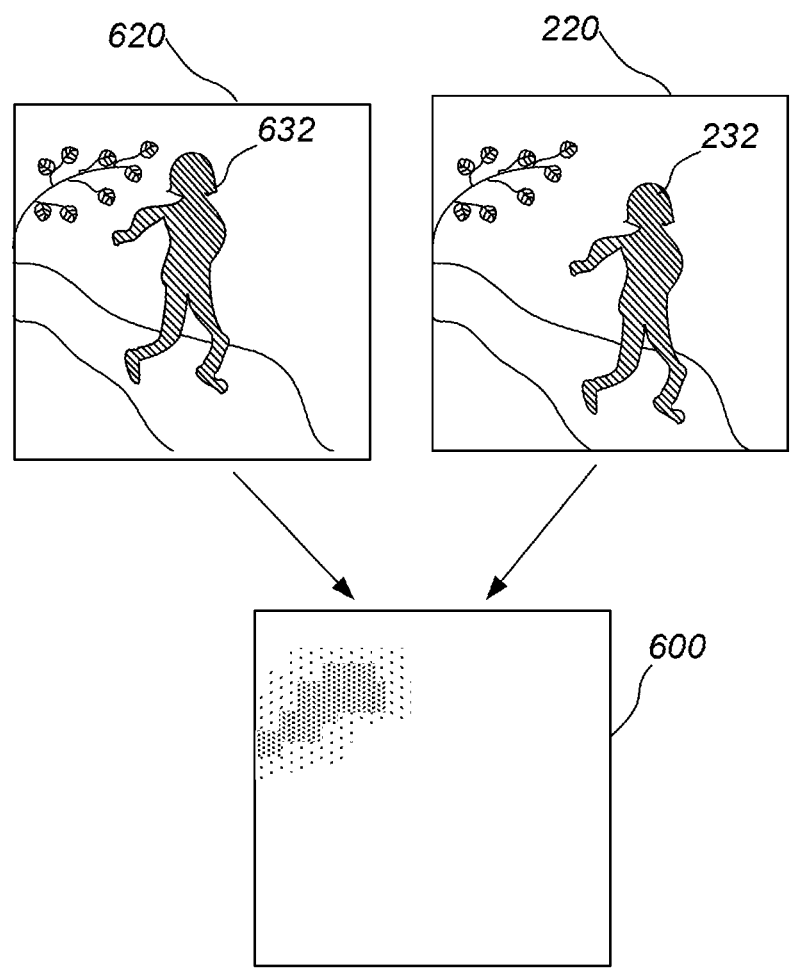
FIG. 6 schematically illustrates a current and a preceding image which are used to update an indicator map in accordance with embodiments.
Figure 7:
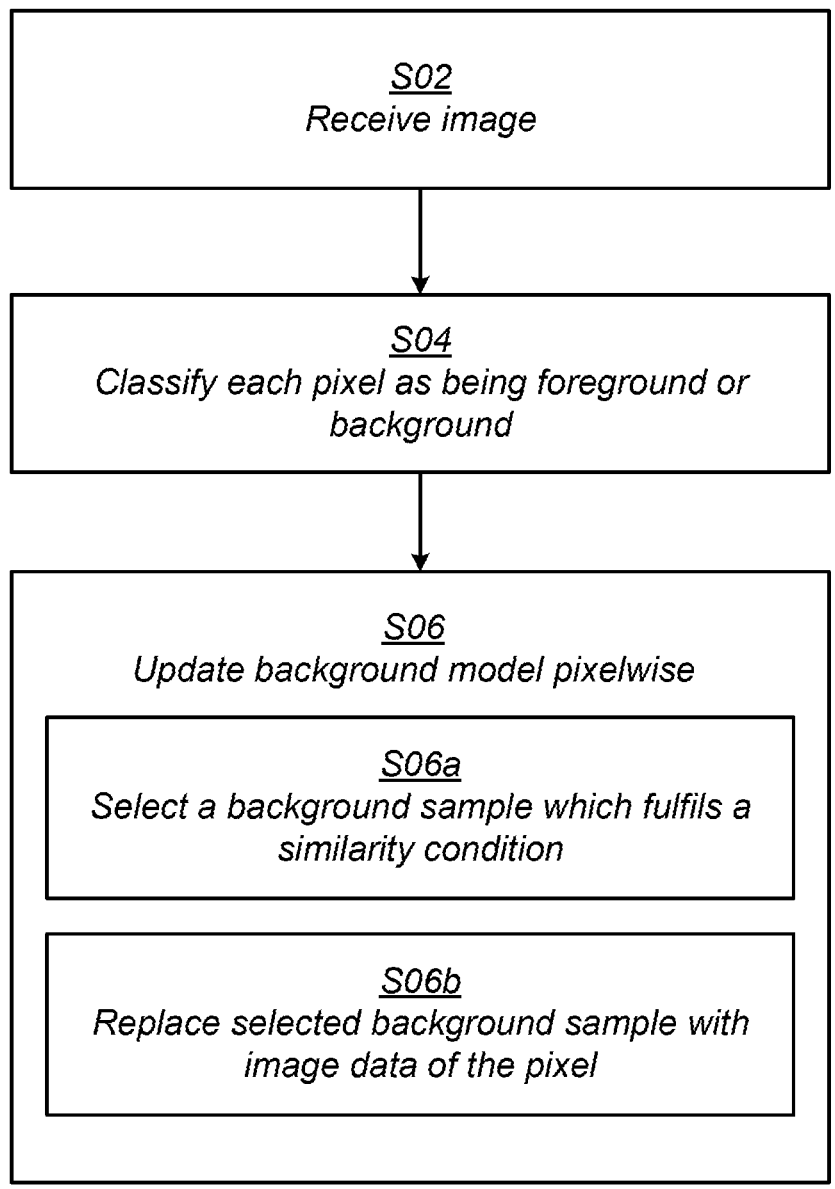
FIG. 7 is a flowchart of a method for updating a background model used for background subtraction of an image according to embodiments.

This is further exemplified in FIG. 6. In order to set the threshold $T_r$, the foreground classifier 114 may keep a two-dimensional map 600 of accumulated modality transition levels of the pixels. This map is referred to as an indicator map. The values of the indicator map thus indicate the tendency of the background to change intensity values between subsequent images in the image sequence. The indicator map thus gives an indication or a measure of the dynamics of the background. Depending on the values in the indicator map, the foreground classifier 114 may then set the threshold $T_r$ for each pixel according to a predefined relation between values of the indicator map and threshold values. This relation typically gives a larger value of the threshold $T_r$ for a larger value of the indicator map in comparison to a lower value in the indicator map. By way of example, the threshold $T_r$ may be selected according to $T_r=T_c+av(m)$, where $T_c$ is a constant and a is a factor which adjusts how much $T_r$ is influenced by the dynamics of the background as given by the indicator map.

The foreground classifier 114 may further update the indicator map 600 in order to adjust to new conditions in the scene, e.g., to changing wind conditions. In particular, the foreground classifier 114 may update the indicator map 600 based on the current image 220 and a preceding image 620 in the image sequence. For this purpose, the foreground classifier 114 may check if a difference between the current image $x_t$, 220, and the preceding image $x_{t-1}$, 620, is larger than a predefined amount $T_m$, and if so, increase the value in the indicator map 600 for such pixels by an increment value, and otherwise decreasing the value in the indicator map 600 by a decrement value. Denoting the value of the indicator map in pixel m by v(m), the foreground classifier may thus update the indicator map 600 as:

$$v(m) = \begin{cases} v(m) + v_{incr} & \text{if } |x_t(m) - x_{t-1}(m)| > T_m \\ v(m) - v_{decr} & \text{otherwise} \end{cases} \quad (4)$$

Typically $v_{incr}$ is larger than $v_{decr}$ in order to quickly respond to new dynamic changes in the background and to decrease slowly since if background movement just happened, it is probable to happen soon again.

The indicator map 600 is only updated for background pixels. In particular, the indicator map is only updated for pixels which are classified as belonging to the background in the current image $x_t$, 220, and the preceding image $x_{t-1}$, 620 (i.e. pixels which falls outside of the foreground region 232 in the current image 220, and the foreground region 632 of the preceding image 620). Further, the foreground classifier 114 may apply a safety margin in order to be sure that only background pixels are used in the update of the indicator map. In more detail, the foreground classifier 114 may neglect background pixels which are spatially close to regions 232, 632, which have been classified as foreground. This may for instance be implemented by applying morphological operations on the classification result. For example, a morphological "dilate" operation on the foreground regions 232, 632 will cause them to grow spatially, thereby adding a safety margin which compensates for potential classification errors.

In step S06, the background updating component 118 proceeds to update the background model. The background model is only updated for pixels which have been classified as background 234, thus being background samples. The updating of the background model is made per pixel and comprises two steps. First, a background sample to be replaced is selected, S06a, from the collection 240 of background samples associated with the pixel. Then, image data of the pixel 228 is used to replace, S06b, the selected background sample in the collection 240.

The background updating component 118 generally selects a background sample which fulfills a similarity condition. The similarity condition may for example be that the image data of the pixel 228 differs by less than a similarity threshold from the background sample, i.e. that $|x_i^c(m) - x_t^c(m)| \leq T_{similarity}$. The similarity threshold may be of comparable magnitude as the threshold $T_r$ described above. For example, the similarity threshold may be set to be equal to, or somewhat lower, than the constant $T_c$ used above in the expression $T_r=T_c+av(m)$.

The background updating component 118 may use different approaches for finding the background sample to be replaced. According to an embodiment, illustrated in FIG. 2, the background updating component 118 searches the collection 240 of background samples until it finds a background sample 242 which fulfills the similarity condition. More specifically, the background updating component 118 compares the image data of the pixel 228 to the background samples in the collection 240 one by one until a background sample 242 which fulfills the similarity condition has been found (if the end of the collection 240 is reached without having found a match, the search may continue from the beginning of the collection 240 until a match has been found, or all background samples in the collection have been visited). When a background sample 242 which fulfills the similarity condition has been found, the search is terminated.

The search may be initiated at a start position 244 (marked by black) in the collection 240, also referred to herein as a start index. The start position 244 may be selected at random. Alternatively, the start position 244 may be selected depending on the start position used to initiate the search with respect to a corresponding pixel in the preceding image in the image sequence. Typically, the start position 244 may be selected to be different than the start position used for the corresponding pixel in the preceding image. By way of example, the start position 244 with respect to the current image may be increased by one in relation to the start position 244 used with respect to the previous image. The same start position 244 may be used for all pixels in the image 220. Alternatively, a different start position 244 may be selected for different pixels in the image.

FIG. 3 illustrates a different approach. In the embodiment of FIG. 3, the background updating component 118 compares the image data of the pixel 228 to all background samples in the collection 240. If more than one background sample in the collection 240 fulfill the similarity condition, the background updating component 118 selects the background sample 342 which is most similar to the image data of the pixel 228. By most similar is typically meant that the background sample 342 which differs the least from the image data of the pixel 228 is selected. More generally, most similar may mean that the background sample which has the smallest distance to the image data of the pixel 228 according to a predefined norm (such as the L1-norm exemplified above, or the L2 norm, i.e., the Euclidean norm) is selected.

In embodiments where the age of the background samples in the collection 240 is kept track of, i.e., for how long they have been in the collection 240, the background updating component 118 may further update the data structure 250. Each value in the data structure 250 is increased by a predefined number, here the number 1, except for the value at the position corresponding to the newly added background sample 242, 342, which is given the value of the predefined number.

The background updating component 118 may arrive at a situation where no background sample in the collection 240 fulfills the similarity condition. In such cases, the background updating component 118 may instead replace a background sample which does not fulfill the similarity condition. For example, the background updating component 118 may replace a background sample at random or by replacing the oldest background sample in the collection 240. In the latter case, the oldest background sample in the collection 240 may be identified by consulting the data structure 250 which keeps track of the age of the background samples. As an alternative, the background updating component 118 may replace the last background sample visited during the iterative search.

To avoid having samples in the collection 240 which are no longer relevant, the background updating component 118 may further implement a mechanism which replaces old, outdated, background samples.

Figure 4:
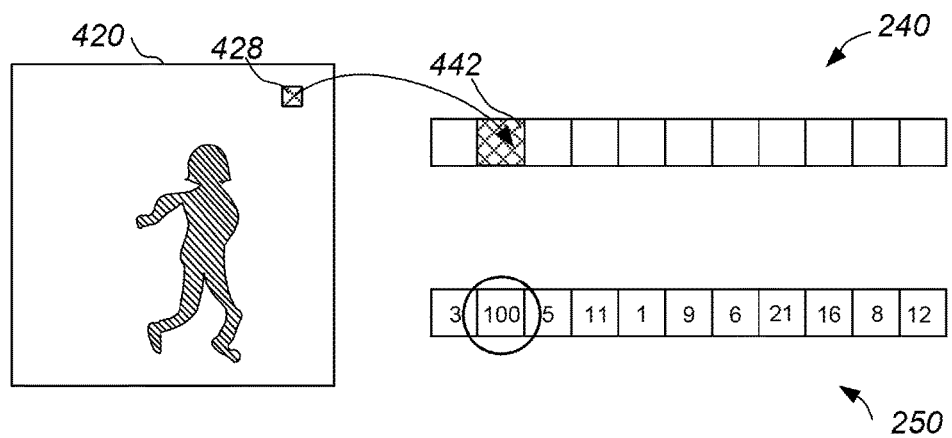

Such an embodiment is illustrated in FIG. 4. The example of FIG. 4 is a continuation of the examples in FIGS. 2 and 3. FIG. 4 illustrates an image 420 which is subsequent to image 220 of FIGS. 2 and 3 in a video sequence. In this example, steps S06a and S06b are made on a condition that no background sample has been in the collection 240 for more than a predefined time limit, which in this example is set to 99. According to practical examples, the predefined time limit may be in the order of magnitude of an hour. In other words, prior to performing steps S06a and S06b, the background updating component 118 checks if any background sample in the collection 240 is older than the predefined time limit. If not, the background updating component 118 proceeds to perform steps S06a and S06b as described above.

However, if background updating component 118 finds that a background sample has been in the collection 240 for longer than the predefined time limit, that background sample is replaced with image data of the pixel 428. In the illustrated example, the background sample 442 has the age 100 as shown in the "age" data structure 250. Since this is longer than the predefined time limit of 99, the background sample 442 is replaced with image data of the pixel 428.

Figure 5:
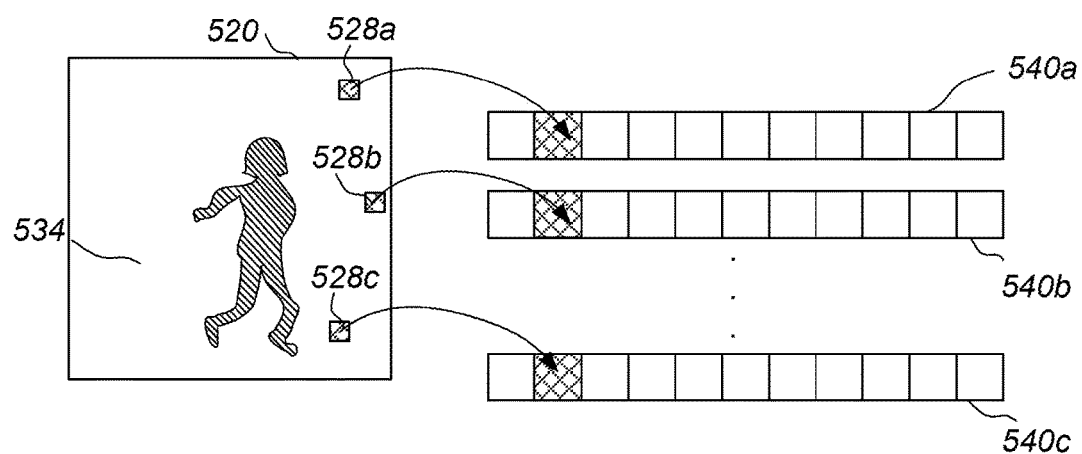

Another approach for replacing old samples is illustrated in FIG. 5. The background updating component 118 may generally update the collection 240 of background samples in accordance with what was described above in connection to steps S06a and S06b. However, at intervals, such as for every Nth image 520 in the sequence, for instance once every $100^{th}$ image, or once every $15^{th}$ minutes, the background updating component 118 may instead proceed to replace background samples having a specific position or index in the collections 520a, 540b, 540c of background samples associated with all pixels 528a, 528b, 528c classified as background 534 in the image 520. Here collections 540a, 540b, 540c which are associated with pixels 528a, 528b, 528c, respectively, are shown. For simplicity, only three pixels and collections are drawn out. However, this applies to all pixels in the image 520 which have been classified as background 534. The background samples at the same position, here the second position, of the collections 540a 540b, 540c are selected and replaced by image data of the pixels 528a, 528b, 528c, respectively. The position in the collections 540a, 540b, 540c, may be chosen at random, or may be selected deterministically. For example, at the first interval, the first position in the collection may be selected, at the second interval, the second position in the collection may be selected, etc. In this way, all background samples will be replaced sooner or later.

According to embodiments, the foreground classifier component 114 may further operate with several background models having different time horizons. In this way, both long term variations and short term variations may be dealt with in an improved manner. For example, there may be a first background model of the type described above (having a collection of background samples for each pixel), and a second background model which is also of the type described above. The background samples of the first background model may be collected from images in the image sequence corresponding to a first time interval, such as the last two seconds. The background samples of the second background model may be collected from images in the image sequence corresponding to a second time interval, such as the last 30 seconds.

When the foreground classifier component 114 operates with several background models, it will compare the image data of a pixel to the background samples in each of the background models, e.g., in the manner discussed above in connection to equation (1). It will then determine that the pixel is foreground if the number of background samples (in all background models when looked at together) which differ from the intensity value of the pixel by less than a threshold is lower than a predefined number. In other words, the sum in equation (2) or the union in equation (3) is over the background samples in all background models.

All background models may be updated in accordance to what has been described above. In particular, as a sequence of images is received, the apparatus 110 may interchangeably update the different background models. In other words, the apparatus 110 may update (at most) one of the background models per received image. In order to allow the background models to have different time horizons, the different background models may be updated with different frequencies—the longer the time horizon, the lower the updating frequency. In the above example, with two background models, the time horizon of the second background model is 15 times as long as the time horizon of the first background model. The updating frequency of the second background model should therefore be a factor of 15 lower than the updating frequency of the first background model. In a specific example, the first background model and the second background model may each have ten background samples per pixel. Images of the image sequence may be received five times each second. The second background model may be updated every 15:th image. The first background model may be updated with respect to all other images.

It will be appreciated that a person skilled in the art can modify the above-described embodiments in many ways and still use the advantages shown in the embodiments above. Thus, the disclosure should not be limited to the shown embodiments but should only be defined by the appended claims. Additionally, as the skilled person understands, the shown embodiments may be combined.

What is claimed is:

1. A method, performed in an apparatus, for updating a background model used for background subtraction of an image, comprising:
    receiving an image being part of a sequence of images;
    classifying each pixel in the image as being foreground or background by performing background subtraction using a background model which comprises a collection of background samples for each pixel in the image, wherein the collection of background samples associated with the pixel is indexed, wherein an index of a background sample indicates a position of the background sample within the collection of background samples associated with the pixels in the image;
    updating the background model by, for each pixel in the image being classified as background, the updating comprising:
        selecting a background sample in the collection of background samples associated with the pixel which fulfils a similarity condition, the similarity condition being fulfilled with respect to a background sample if the background sample differs from image data in the pixel by less than a similarity threshold; and
        replacing the background sample which fulfils the similarity condition with image data of the pixel,
    wherein the selecting comprises iteratively searching the collection of background samples associated with the pixel by comparing the image data of the pixel to the background samples in the collection of background samples one by one until a background sample which fulfils the similarity condition is found,
    wherein the iterative searching is initiated at an index in the collection of background samples which follows an index used to initiate an iterative search with respect to pixels in a preceding image in the image sequence.

2. The method of claim 1, wherein, if no background sample in the collection of background samples fulfils the similarity condition, a background sample which does not fulfil the similarity condition is replaced.

3. The method of claim 1, further comprising, for each pixel in the image:
    keeping track of for how long each background sample has been in the collection of background samples associated with the pixel,
    wherein the steps of selecting and replacing are made on a condition that no background sample has been in the collection of background samples for longer than a predefined time limit, and
    wherein, if a background sample has been in the collection for longer than the predefined time limit, the background sample which has been in the collection of background samples for longer than the predefined time limit is replaced with image data of the pixel.

4. The method of claim 1, further comprising:
    receiving a sequence of images and repeating the steps of classifying and updating for each image in the sequence of images, except for every Nth image in the sequence of images, wherein N>2, for which the updating of the background model is instead made by, for each pixel in the Nth image being classified as background; and
    replacing a background sample in the collection of background samples associated with the pixel with image data of the pixel, wherein the replaced background sample has an index in the collection of background samples which is the same for all pixels in the Nth image.

5. The method of claim 1, wherein the step of classifying each pixel in the image as being foreground or background comprises, for each pixel in the image:
    comparing the image data of the pixel to each of the background samples in the collection of background samples associated with the pixel; and
    determining that the pixel is foreground if the number of background samples which differ from the image data of the pixel by less than a classification threshold is lower than a predefined number.

6. The method of claim 5, wherein the predefined number is equal to one, and wherein the step of determining that the pixel is foreground comprises:
    checking if at least one of the background samples associated with the pixel differ from the image data of the pixel by less than a classification threshold by performing a logical "or"-operation, and if not, determining that the number of background samples which differ from the image data of the pixel by less than a threshold is lower than the predefined number, thereby determining that the pixel is foreground.

7. A non-transitory computer-readable medium having computer readable program code recorded thereon which when executed on a device having processing capability is configured to perform operations comprising:
    receiving an image being part of a sequence of images;
    classifying each pixel in the image as being foreground or background by performing background subtraction using a background model which comprises a collection of background samples for each pixel in the image, wherein the collection of background samples associated with the pixel is indexed, wherein an index of a background sample indicates a position of the background sample within the collection of background samples associated with the pixels in the image;

updating the background model by, for each pixel in the image being classified as background, the updating comprising:

selecting a background sample in the collection of background samples associated with the pixel which fulfils a similarity condition, the similarity condition being fulfilled with respect to a background sample if the background sample differs from image data in the pixel by less than a similarity threshold; and replacing the background sample which fulfils the similarity condition with image data of the pixel, wherein the selecting comprises iteratively searching the collection of background samples associated with the pixel by comparing the image data of the pixel to the background samples in the collection of background samples one by one until a background sample which fulfils the similarity condition is found, wherein the iterative searching is initiated at an index in the collection of background samples which follows an index used to initiate an iterative search with respect to pixels in a preceding image in the image sequence.

8. An apparatus for updating a background model used for background subtraction of an image, comprising:

an image receiver configured to receive an image from a camera, the image being part of a sequence of images;

a processor configured to classify each pixel in the image as being foreground or background by performing background subtraction using a background model which comprises a collection of background samples for each pixel in the image, wherein the collection of background samples associated with the pixel is indexed, wherein an index of a background sample indicates a position of the background sample within the collection of background samples associated with the pixel in the image;

the processor configured to update the background model by, for each pixel in the image being classified as background:

selecting a background sample in the collection of background samples associated with the pixel which fulfils a similarity condition, the similarity condition being fulfilled with respect to a background sample if the background sample differs from image data in the pixel by less than a similarity threshold; and replacing the background sample which fulfils the similarity condition with image data of the pixel, wherein the selecting of a background sample comprises iteratively searching the collection of background samples associated with the pixel by comparing the image data of the pixel to the background samples in the collection of background samples one by one until a background sample which fulfils the similarity condition is found, wherein the iterative search is initiated at an index in the collection of background samples which follows an index used to initiate an iterative search with respect to pixels in a preceding image in the image sequence.

* * * * *